United States Patent [19]
Durst et al.

[11] 3,918,594
[45] Nov. 11, 1975

[54] APPARATUS FOR FEEDING ELONGATED MATERIAL TO A MACHINING TOOL

[75] Inventors: Roland Durst, Wendlingen (Neckar); Kurt Schweizer, Reichenbach, both of Germany

[73] Assignee: Hermann Traub, Germany

[22] Filed: Oct. 17, 1974

[21] Appl. No.: 515,466

[30] Foreign Application Priority Data
Oct. 23, 1973 Germany............................ 2353000

[52] U.S. Cl.................................. 214/1.5; 82/2.5
[51] Int. Cl.² .................................... B23Q 5/22
[58] Field of Search ............... 214/1.1, 1.2, 1.3, 1.4, 214/1.5; 198/221; 82/2.5, 2.7

[56] References Cited
UNITED STATES PATENTS
| | | | |
|---|---|---|---|
| 2,656,859 | 10/1953 | Retz | 214/1.4 |
| 3,027,018 | 3/1962 | Hemingway | 214/1.5 |
| 3,799,363 | 3/1974 | Ross | 214/1.2 |

FOREIGN PATENTS OR APPLICATIONS
1,777,170   5/1972   Germany

*Primary Examiner*—Frank E. Werner
*Attorney, Agent, or Firm*—Roylance, Abrams, Berdo & Kaul

[57] ABSTRACT

Apparatus for feeding elongated material, such as rods, to a machine tool wherein the machine tool is actuated when the elongated rod is at a predetermined position relative to the machine tool. Simultaneous actuation of a solenoid, permitting the elongated rod to move toward the machine tool, and of a clutch coupling, causing a control member to move from a first position to a second position where it closes a switch actuating the machine tool, accomplishes the task. The control member is connected to a connecting element which is in turn connected to the coupling and the connecting element is under a biasing force tending to return it and the control member to the first position.

8 Claims, 3 Drawing Figures

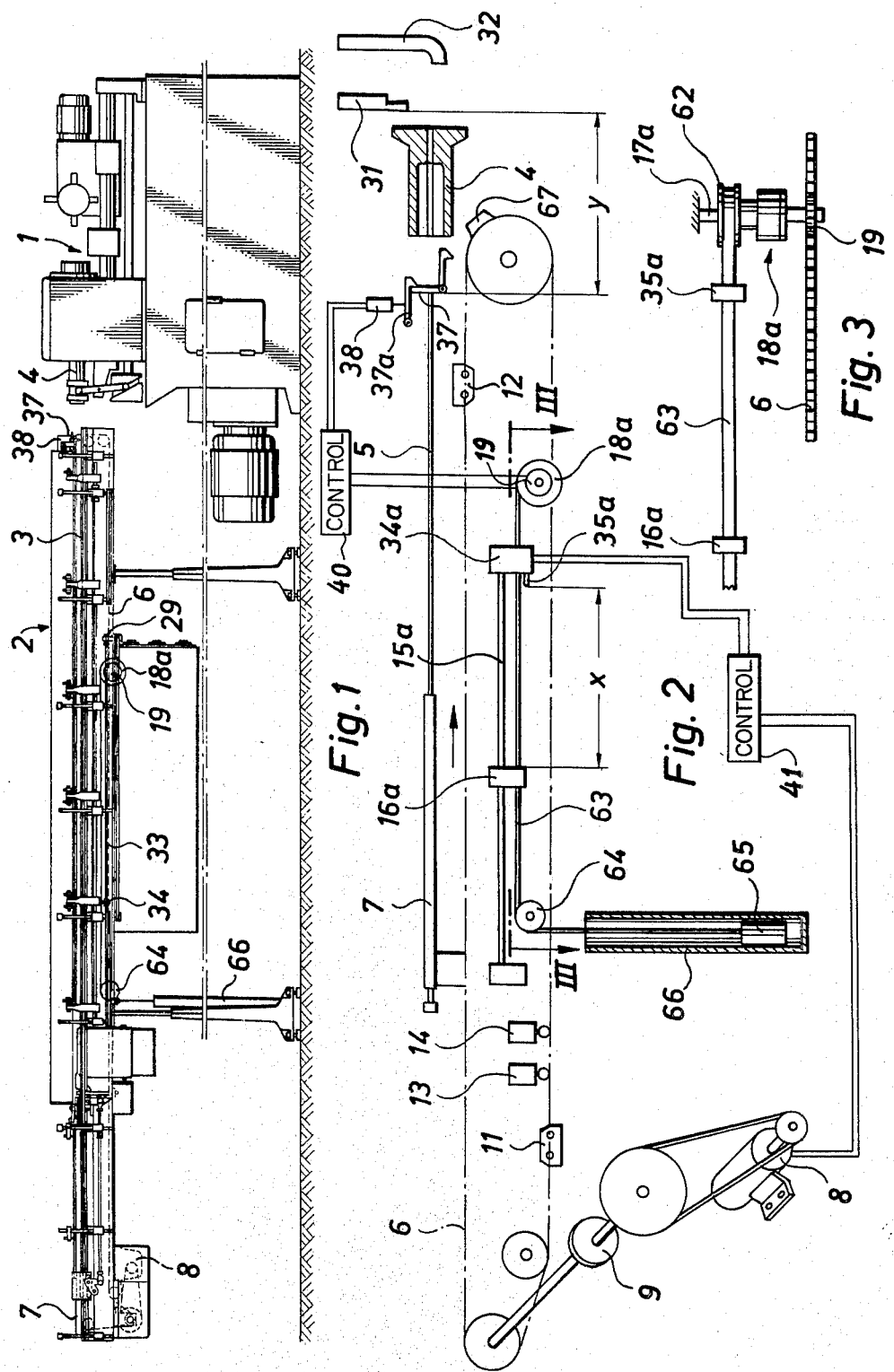

APPARATUS FOR FEEDING ELONGATED MATERIAL TO A MACHINING TOOL

This invention relates to an apparatus for feeding elongated material to a machine tool, and more particularly relates to an apparatus for controlling a single spindle lathe having a rod fed thereto so that the lathe begins working on the rod when the rod is at a predetermined position relative to the lathe. The invention described in more detail below is an improvement on the apparatus disclosed in allowed copending U.S. application Ser. No. 411,298, filed Oct. 30, 1973, in the name of Holger Scheler, the contents of which are incorporated herein by reference.

In feeding rods, and like material, to the machining portions of lathes, it is quite important to have the machining operation begin when the rod is positioned at a specific location relative to the machining portion. For example, quite often the ends of elongated rods, having been handled and stored for a while, tend to be dented or otherwise imperfect. Thus, before machining the entire rod, it is advantageous to first sever a small end section of the rod. Accordingly, it will be necessary in such a case for the severing tool in the lathe to act on the rod when the rod section is sufficiently past that tool to remove the desired length of the rod.

The invention of this application accomplishes the desired result by the simultaneous actuation of a solenoid which permits the rod to move toward the lathe and of a clutch coupling which causes a control member to move from a first position to a second position where it closes a switch actuating the lathe. The improvement of the invention disclosed herein over that disclosed in Ser. No. 411,298, is that the control member is returned to its first position by means of a simple and efficient mechanism. Broadly, that mechanism includes a connecting element interconnecting the control member and the coupling and a biasing element coupled to the connecting element.

In summary, the invention comprises a base supporting a workpiece; a conveyor member coupled to said base and arranged for movement in first and second directions; a thrust rod coupled to said conveyor member and disposed to contact and move the workpiece toward the machine tool; means for permitting said thrust rod to move the workpiece toward the machine tool; a control member coupled to said base for movement between a first and second position; a connecting element movably supported on said base and coupled to said control member; coupling means, connected to said connecting element and releasably connected to said conveyor member, for imparting movement to said connecting element when actuated; means for actuating said coupling means while said control member is in said first position to thereby move said connecting element and said control member coupled thereto to said second position; means for actuating said means for permitting to initiate movement of the workpiece toward the machine tool concurrently with actuation of said coupling means; means for deactuating said coupling means and for actuating the machine tool when said control member has reached said second position, and said workpiece has reached a predetermined position relative to the machine tool; and means for moving said control member from said second position to said first position, said means for moving including a biasing element coupled to said connecting element.

The connecting element can advantageously be a band or belt which can be rolled up on a drum connectable with the coupling. However, it is also possible to make the connecting element a toothed rack or a connecting chain in which case the coupling drum would have sprockets on its periphery. The biasing mechanism can be a weight or a spring.

Other objects, advantages and salient features of the present invention will become apparent from the following detailed description, which, taken in conjunction with the annexed drawings, discloses a preferred embodiment of the present invention.

Referring now to the drawings which form a part of this original disclosure:

FIG. 1 shows a side elevational view of the apparatus in accordance with the present invention;

FIG. 2 is a diagrammatic sketch of the apparatus of FIG. 1 at a different scale; and FIG. 3 is a sectional view taken along lines III-III in FIG. 2.

Referring to the drawings in further detail, as shown in FIG. 1, an apparatus for the delivery of working material rods 5, hereinafter referred to as the rod loading magazine base 2, is associated with a single spindle automatic lathe 1, in such a way that a guide trough 3 of the rod loading magazine base is disposed coaxially to the main spindle 4 of the single spindle automatic lathe 1. A rod of working material 5, located in the guide trough 3, is movable in the direction of the single spindle automatic lathe 1 by means of a thrust rod 7, movable in the guide trough 3 and connected to a conveying chain 6. The conveying chain 6 can be driven in two directions by means of a driving motor 8 and a slipping clutch 9. Two control cams 11 and 12, as seen in FIG. 2, are attached to the endless conveying chain 6, which cooperates with two control switches 13 and 14, provided on the frame of the rod loading magazine to turn motor 8 off, as described in further detail hereinafter.

As seen in FIG. 2, in the area of the underside of the rod loading magazine base 2, a guide rod 15a is fixedly attached on which a control element 16a, developed as a sliding body, can be shifted. A magnetically operable clutch coupling 18a is rotatably mounted on a locally fixed bearing pin 17a. A part of the coupling 18a is rigidly connected to a sprocket wheel 19, which is rotatably mounted coaxially with the coupling on the bearing pin 17a. The other part of the coupling 18a is rigidly connected with a drum 62, which is likewise mounted rotatably on the bearing pin 17a. A belt-shaped connecting element 63 is wound on the drum 62 and is connected to the control element 16a in a longitudinally adjustable manner. The two parts of coupling 18a are locked for rotation together upon energization thereof by an energizing signal from a control unit 40 which can be part of the control apparatus for the single spindle lathe 1. On the side opposite the drum 62, the connecting element 63 is guided around a deflecting drum 64 and at the end, facing away from the drum 62, a weight acting as an accumulator 65 is attached, which is housed in a perpendicularly standing, fixed casing 66 for vertical motion with movement of element 63.

On the guide rod 15a, a switch 35a, operable by contact with control element 16a, is attached on a stop 34a and is penetrated by a connecting element 63. Switch 35a is connected to a control unit 41 which can be part of the control apparatus for the lathe.

A plurality of tools are assigned to the spindle 4 of the single spindle automatic lathe 1, of which only one tool 31 is shown in FIG. 2. Furthermore, a stop 32, for stopping the working material rod 5, penetrating the main spindle 4 and which can be moved in and out of an effective position as desired, is provided. At the end of the rod loading magazine base 2, facing the single spindle automatic lathe 1, a lid 37, lockable by means of a latch 37a in its locking position, is attached, which in the swing-in illustrated state constitutes a lock for the working material rod 5 shiftable in the direction of the automatic lathe 1. The latch 37a can be moved by means of an electromagnetic solenoid 38 out of its closing position and can be returned into this position under its own weight. A cam 67 is attached to the conveying chain 6, which serves to return the lid 37 to its locking position, in which it is held by the latch 37a. Solenoid 38 is operated by an energizing signal from control unit 40, which signal is supplied concurrently with an energizing signal from clutch 18a.

The control switch 13 can be operated by the cam 11, and turns the driving engine 8 off, whenever the thrust rod 7 has reached its rear position on moving away from the lathe 1. The control switch 14 is operated by the control cam 12 and turns off the driving motor 8, driven in a different rotational direction than previously described, whenever the working material rod 5 is used up after moving toward the lathe 1.

OPERATION

With a rod 5 placed in the magazine base 2, the conveyor chain 6 is actuated by motor 8 so that the thrust rod 7 moves a working material rod 5 toward the lathe 1. This shifting of the working material rod 5 in the direction of the single spindle automatic lathe 1 is initially completed by the stopping of the front end of the rod 5 at the lid 37, which is in the closed position. During the stoppage of the working material rod 5 at this lid, a clamping bush provided on the thrust rod 7 is slipped onto the rear end of the working material rod 5 to secure the rod 5 to rod 7. After a time interval, adjustable in the control for the loading magazine, the shifting coupling 18a is operated by an energizing signal from control unit 40 and the sprocket wheel 19, which otherwise is freely rotatable on the bearing pin 17a, is rigidly connected by means of shifting coupling 18 with the drum 62, which otherwise is also freely rotatable on the bearing pin 17a. Moreover, simultaneously the lid 37 is released when the latch 37a is raised by means of the magnet 38 which is also energized by control unit 40. As a result of that, the lid 37 pivots out of its locking position, as a result of which the working material rod 5 is permitted to be shifted further in the direction toward the single spindle automatic lathe 1 by action of conveyor 6.

As a result of the connection of the sprocket wheel 19 with the drum 62, the latter, driven by the conveying chain 6, begins to wind up the connecting element 63, as a result of which the control element 16a moves from its first position in the direction toward the switch 35a to its second position in which it contacts that switch. Upon operation of the switch 35a by the control element 16a, an impulse for switching on of the spindle automatic lathe 1 is provided via control unit 41.

The distance x in FIG. 2 between the control element 16a and the switch 35a is equal to that of the path y covered by the working material rod 5 from the lid 37 up to a certain position in the single spindle automatic lathe 1, shortly behind its cutting off tool 31, so that the point or end of the working material rod 5 can be cut off.

When the single spindle automatic lathe 1 is switched on by closing of switch 35a and has seized the working material rod 5 with its collet chuck located in the main spindle 4, the shifting coupling 18a is separated from its power source and thus is disengaged so that the sprocket wheel 19 and the drum 62 can again revolve loosely on the bearing pin 17a. The impulse for this is delivered by the control unit 41 of the single spindle automatic lathe. As soon as the drum 62 can again revolve freely on the bearing pins 17a, the accumulator or weight 65 is lowered and the control element 16a is returned into its starting, or first, position as shown in FIG. 2.

Whenever the working material rod 5 is used up, the single spindle automatic lathe 1 is stopped with the clamping arrangement open. The driving motor 8 is then connected via control unit 41 with its power source in such a way that it removes the thrust rod 7 from the single spindle automatic lathe 1. As soon as the rod has returned into its starting position, a new working material rod 5 can be inserted into the guide trough 3 from the rod loading magazine base 2. The previously described process is repeated for processing of the end of the working material rod adjacent to the single spindle automatic lathe 1.

During the return of the thrust rod 7 into its rear position, the lid 37 is returned to its locking position by means of cam 67 attached on the conveying chain 6, in which position it is then held by latch 37a. This return takes place shortly before the rear position of the thrust rod 7 has been reached.

The connecting element 63 can be developed as a chain or a toothed rod, whereby a sprocket wheel or a gear is used instead of the drum 62. A spring can also serve as an accumulator 65 in which case the spring is coupled at one end to the connecting element 63 and at its other end to a fixed portion of the magazine base 2.

While one advantageous embodiment has been chosen to illustrate the invention, it will be understood by those skilled in the art that various changes and modifications can be made therein without departing from the scope of the invention as defined in the appended claims.

What is claimed is:

1. Apparatus for controlling a machine tool having an elongated workpiece fed thereto, comprising:
    a base supporting a workpiece;
    a conveyor member coupled to said base and arranged for movement in first and second directions;
    a thrust rod coupled to said conveyor member and disposed to contact and move the workpiece toward the machine tool;
    means for permitting said thrust rod to move the workpiece toward the machine tool;
    a control member coupled to said base for movement between a first and second position;
    a connecting element movably supported on said base and coupled to said control member;
    coupling means, connected to said connecting element and releasably connected to said conveyor member, for imparting movement to said connecting element when actuated;

means for actuating said coupling means while said control member is in said first position to thereby move said connecting element and said control member coupled thereto to said second position;

means for actuating said means for permitting to initiate movement of the workpiece toward the machine tool concurrently with actuation of said coupling means;

means for deactuating said coupling means and for actuating the machine tool when said control member has reached said second position, and said workpiece has reached a predetermined position relative to the machine tool; and means for moving said control member from said second position to said first position, said means for moving including a biasing element coupled to said connecting element.

2. Apparatus according to claim 1, wherein
said connecting element is a belt, and
said coupling means includes a drum upon which said belt is wound.

3. Apparatus according to claim 1, wherein
said connecting element is a chain, and
said coupling means includes a sprocket wheel driving said chain.

4. Apparatus according to claim 1, wherein
said connecting element is a toothed rod, and
said coupling means includes a pinion mating with said toothed rod.

5. Apparatus according to claim 1, wherein said control member is coupled to said connecting element for adjustment along the length of said connecting element.

6. Apparatus according to claim 1, wherein
said biasing element is a weight, and
said means for moving further includes a drum coupled to said base and around which said connecting element is guided.

7. Apparatus according to claim 1, wherein
said biasing element is a spring coupled to said base.

8. Apparatus according to claim 1, wherein
said means for permitting includes a lid pivotally mounted along the path of the workpiece, and means for releasably securing said lid in a position to block movement of the workpiece toward the machine tool.

* * * * *